United States Patent [19]

Misawa et al.

[11] Patent Number: 5,739,298
[45] Date of Patent: Apr. 14, 1998

[54] WATER-SOLUBLE AZO COMPOUNDS

[75] Inventors: Tsutami Misawa; Akira Ogiso, both of Yokohama; Rihoko Imai, Tokyo; Hisato Itoh, Yokohama, all of Japan

[73] Assignee: Mitsui Toatsu Chemicals, Inc., Tokyo, Japan

[21] Appl. No.: 655,234

[22] Filed: Jun. 5, 1996

Related U.S. Application Data

[60] Continuation of Ser. No. 404,429, Mar. 15, 1995, Pat. No. 5,548,073, which is a division of Ser. No. 95,839, Jul. 23, 1993, Pat. No. 5,423,100.

[30] Foreign Application Priority Data

Aug. 26, 1992 [JP] Japan ................ 4-226955

[51] Int. Cl.$^6$ ................ C09B 56/04; G02B 5/30
[52] U.S. Cl. ................ 534/689; 534/690
[58] Field of Search ................ 534/689

[56] References Cited

U.S. PATENT DOCUMENTS

| | | | |
|---|---|---|---|
| 2,175,815 | 10/1939 | Schindhelm | 534/690 |
| 2,741,655 | 4/1956 | Riat et al. | 534/690 |
| 4,514,559 | 4/1985 | Sato et al. | 534/690 |
| 4,774,141 | 9/1988 | Matsui et al. | 428/414 |
| 4,859,039 | 8/1989 | Okumura et al. | 350/398 |
| 5,007,942 | 4/1991 | Claussen et al. | 8/506 |
| 5,272,259 | 12/1993 | Claussen et al. | 534/689 |
| 5,423,100 | 6/1995 | Misawa et al. | 534/689 X |

FOREIGN PATENT DOCUMENTS

| | | | |
|---|---|---|---|
| 376032 | 7/1990 | European Pat. Off. | 534/689 |
| 1066405 | 6/1954 | France | 534/690 |
| 59-145255 | 8/1984 | Japan | 534/689 |
| 60-156759 | 8/1985 | Japan | 534/689 |
| 60-168743 | 9/1985 | Japan | 534/689 |
| 6-122830 | 5/1994 | Japan | 534/689 |
| 501486 | 2/1939 | United Kingdom | 534/690 |
| 744406 | 2/1956 | United Kingdom | 534/690 |

*Primary Examiner*—Fiona T. Powers
*Attorney, Agent, or Firm*—Burns, Doane, Swecker & Mathis, L.L.P.

[57] ABSTRACT

Novel azo compounds having the specific structural formula (1) or (3) set out below, water-soluble dyes containing the compounds, and polarizing films containing the water-soluble dyes:

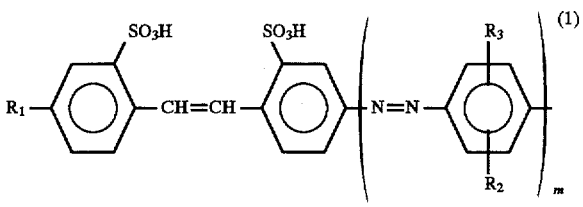

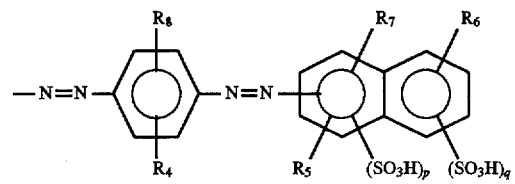

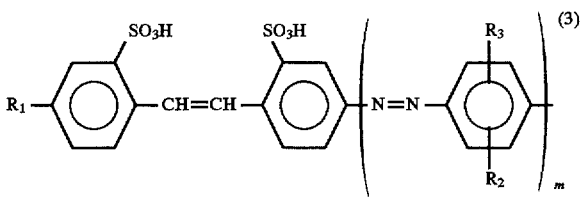

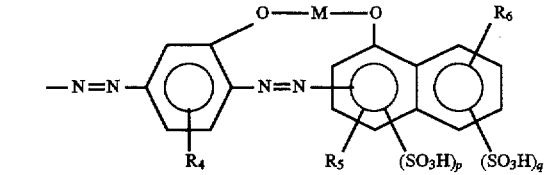

wherein $R_1$ represents a hydrogen or halogen atom or a hydroxyl, $C_{1-2}$ alkyl, $C_{1-2}$ alkoxyl, $C_{1-2}$ acylamino, cyano, carboxyl or sulfonic acid group; $R_3$ and $R_8$ individually represent a hydrogen atom or a hydroxyl, $C_{1-2}$ alkyl or $C_{1-2}$ alkoxyl group; $R_2$ and $R_4$ individually represent a hydrogen atom or a hydroxyl, $C_{1-2}$ alkyl, $C_{1-2}$ alkoxyl or $C_{1-2}$ acylamino group; $R_5$ represents a hydrogen atom or a carboxyl or $C_{1-2}$ alkoxyl group; $R_6$ represents a hydrogen atom, a hydroxyl, amino, methylamino, β-hydroxyethylamino or $C_{1-2}$ acylamino group, or a phenylamino or benzoylamino group which the phenyl nucleus may be substituted by one or more nitro, amino, hydroxyl, $C_{1-2}$ alkyl, carboxyl and/or sulfonic acid groups and/or chlorine atoms; $R_7$ represents a hydroxyl or amino group and substitutes at o- or p-position relative to the azo group; m stands for 0 or 1; p stands for 0 or 1; q stands for 0, 1 or 2; and M represents a copper, nickel, zinc and iron atom.

2 Claims, No Drawings

WATER-SOLUBLE AZO COMPOUNDS

This application is a continuation of application Ser. No. 08/404,429, filed Mar. 15, 1995, now U.S. Pat. No. 5,548,073, which is a divisional of application Ser. No. 08/095,839 filed on Jul. 23, 1993 (now U.S. Pat. No. 5,423,100).

BACKGROUND OF THE INVENTION

1. Field of the Invention

This invention relates to novel azo compounds, metal complex compounds thereof, water-soluble azo dyes containing the azo compounds or metal complex compounds, and polarizing films having high durability and high polarity, said polarizing films being made of polymer films dyed with the dyes as dichroic dyestuff and oriented.

2. Description of the Related Art

It is now the common practice to produce a polarizing film by dyeing a stretched and oriented film of polyvinyl alcohol or a derivative thereof or an oriented film of a polyene with iodine or a dichroic dye as a polarizing element.

Among such polarizing films, those making use of iodine as a polarizing element are excellent in initial polarizing ability but are weak against water or heat. They are hence accompanied by a problem in durability when employed over a long period of time under high temperature and humidity conditions. To improve their durability, it has been proposed, for example, to intensify their treatment in an aqueous solution containing formaldehyde or boric acid or to use, as a protective film, a polymer film having low moisture permeability. Their durability is however still insufficient under high temperature and moisture conditions.

Polarizing films making use of a dichroic dye as a polarizing element, compared with polarizing films using iodine, have better resistance against water and heat but are inferior in polarizing ability. With a view toward improving this drawback, polarizing films using an organic dye as a polarizing element and having improved hydrothermoresistance and polarizing ability are proposed in Japanese Patent Laid-Open Nos. 145255/1984, 156759/1985 and 168743/1985; and U.S. Pat. Nos. 4,514,559 and 4,859,039.

When employed as polarizing films, such organic dyes are generally used in combination with a dye having absorption in a particular wavelength range to provide the polarizing films with a neutral color. It is therefore the current situation that depending on the dyes employed, such polarizing films may undergo (1) a substantial color change at high temperatures, (2) a substantial change in polarizing ability due to the type of the dye employed for obtaining the neutral color or (3) color irregularity depending on the dyeability of the dyes.

SUMMARY OF THE INVENTION

An object of the present invention is to provide a polarizing film, and specifically to provide a high-performance polarizing film capable of exhibiting polarizing ability comparable with iodine-based polarizing films despite being a dye-based polarizing film and, even when two or more dyes are used in combination to provide a neutral color, it has excellent polarizing ability and hydrothermoresistance.

The present inventors have conducted extensive research with a view toward obtaining a polarizing film which uses a dye as a polarizing element and is excellent in polarizing ability and hydrothermoresistance, resulting in the completion of the present invention.

The present invention therefore provides:

1) A novel azo compound represented by one of the following formulas (1)–(4):

Formula (1) being:

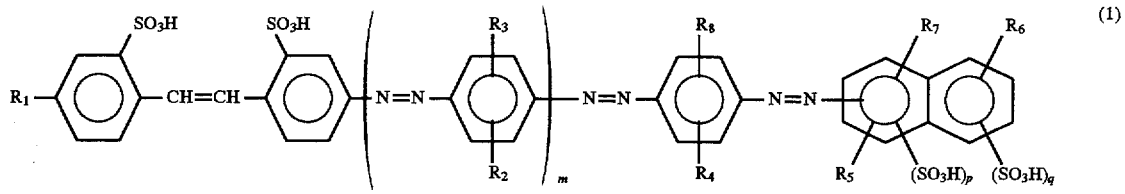

wherein $R_1$ represents a hydrogen or halogen atom or a hydroxyl, $C_{1-2}$ alkyl, $C_{1-2}$ alkoxy, $C_{1-2}$ acylamino, cyano, carboxyl or sulfonic acid group; $R_3$ and $R_8$ individually represent a hydrogen atom or a hydroxyl, $C_{1-2}$ alkyl or $C_{1-2}$ alkoxyl group; $R_2$ and $R_4$ individually represent a hydrogen atom or a hydroxyl, $C_{1-2}$ alkyl, $C_{1-2}$ alkoxy or $C_{1-2}$ acylamino group; $R_5$ represents a hydrogen atom or a carboxyl or $C_{1-2}$ alkoxy group; $R_6$ represents a hydrogen atom, a hydroxyl, amino, methylamino, β-hydroxyethylamino or $C_{1-2}$ acylamino group, or a phenylamino or benzoylamino group which the phenyl nucleus may be substituted by one or more nitro, amino, hydroxyl, $C_{1-2}$ alkyl, carboxyl and/or sulfonic acid groups and/or chlorine atoms; $R_7$ represents a hydroxyl or amino group and substitutes at o- or p-position relative to the azo group; m stands for 0 or 1; p stands for 0 or 1; and q stands for 0, 1 or 2.

Formula (2) being:

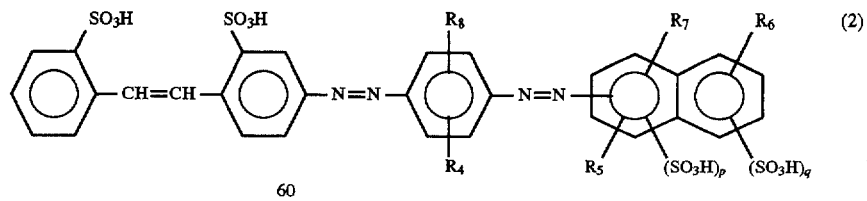

wherein $R_4$ represents a hydrogen atom or a hydroxyl, $C_{1-2}$ alkyl, $C_{1-2}$ alkoxy or $C_{1-2}$ acylamino group; $R_8$ represents a hydrogen atom or a hydroxyl, $C_{1-2}$ alkyl or $C_{1-2}$ alkoxy group; $R_5$ represents a hydrogen atom or a carboxyl or $C_{1-2}$ alkoxy group; $R_6$ represents a hydrogen atom, a hydroxyl, amino, methylamino, β-hydroxyethylamino or $C_{1-2}$ acylamino group, or a phenylamino or benzoylamino group which the phenyl nucleus may be substituted by one or more nitro, amino, hydroxyl, $C_{1-2}$ alkyl, carboxyl and/or sulfonic acid groups and/or chlorine atoms; $R_7$ represents a hydroxyl or amino group and substitutes at o- or p-position relative to the azo group; p stands for 0 or 1; and q stands for 0, 1 or 2.

Formula (3) being:

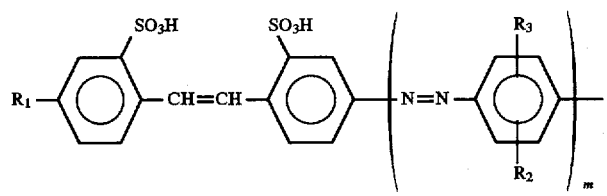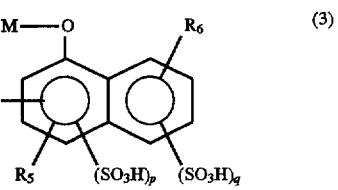

wherein $R_1$, $R_2$, $R_3$, $R_4$, $R_5$, $R_6$, m, p and q have the same meanings as defined above in formula (1); and M represents a copper, nickel, zinc or iron atom.

Formula (4) being:

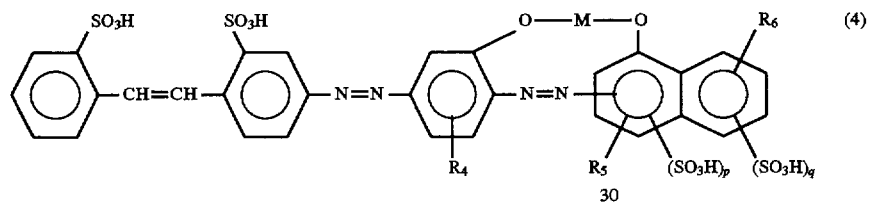

wherein $R_4$, $R_5$, $R_6$, p and q have the same meanings as defined above in formula (2) and M represents a copper, nickel, zinc and iron atom 2) A water-soluble dye containing the compound described above under 1)

3) A polarizing film obtained by dyeing a polymer film with the water-soluble dye described under 2) and then stretching the dyed film 4) A neutral-color polarizing film obtained by dyeing a polymer film with a water-soluble dye containing at least one of the compounds represented by formula (1), C.I. Direct Yellow 12, C.I. Direct Orange 39, C.I. Direct Red 81 and C.I. Direct Blue 202 (C.I. Generic Name) and then stretching the dyed film 5) A neutral-color polarizing film obtained by dyeing a polymer film with a water-soluble dye containing at least one of the compounds represented by formula (3), C.I. Direct Orange 39, C.I. Direct Red 81 and C.I. Direct Blue 202 (C.I. generic name) and then stretching the dyed film 6) The polarizing film as described above under 3), 4) or 5), wherein the polymer film is made of polyvinyl alcohol, polyvinyl formal, polyvinyl acetal or polyvinyl butyral, that obtained by modifying polyvinyl alcohol, polyvinyl formal, polyvinyl acetal or polyvinyl butyral with ethylene, propylene, acrylic acid, maleic acid or acrylamide, or a cellulose resin 7) The polarizing film as described above under 3), 4) or 5), wherein the dyed polymer film has been stretched at a draw ratio of 2 to 9 times The polarizing film, which has been obtained using the water-soluble dye containing the novel azo compound of the present invention, has high heat stability and high polarity and therefore shows optical characteristics comparable with conventional iodine-base polarizing films. This invention, therefore, has brought about marked valuable advantages from the industrial viewpoint.

DETAILED DESCRIPTION OF THE PREFERRED EMBODIMENTS

Examples of the water-soluble azo compound of the present invention include those represented by formulas (1)–(4). Among them, those represented by formulas (2) and (4) are particularly preferred.

Each compound of this invention represented by formula (1) can be prepared by known diazotization and coupling techniques in accordance with a conventional preparation process of azo dyes.

For example, a compound represented by the following formula (5):

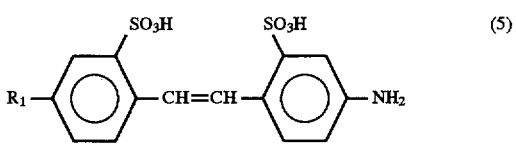

wherein $R_1$ has the same meaning as defined above in formula (1) is diazotized in a manner known per se in the art, for instance, by using sodium nitrite in a mineral acid at 0°–30° C., followed by the coupling at 0°–30° C. and pH 3–5 with an aniline represented by the following formula (6)

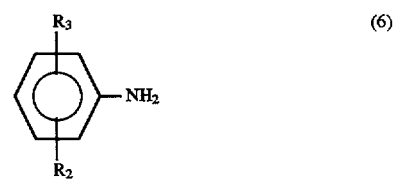

wherein $R_2$ and $R_3$ have the same meanings as defined in formula (1), whereby a monoazo compound represented by the following formula (7):

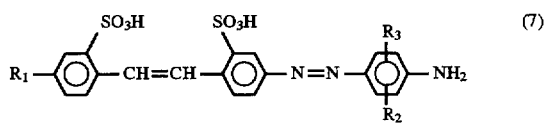

wherein $R_1$, $R_2$ and $R_3$ have the same meanings as defined above in formula (1) is obtained.

After the monoazo compound of formula (7) so obtained is diazotized further in a manner known per se in the art, for instance, by using sodium nitrite in a mineral acid at 0°–30° C., the diazotized compound is coupled at 0°–30° C. and pH 3–5 with an aniline represented by the following formula (8):

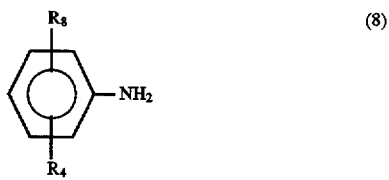

wherein $R_4$ and $R_8$ have the same meanings as defined in formula (1), whereby a disazo compound represented by the formula (9):

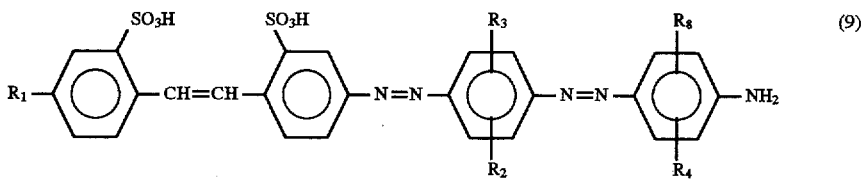

wherein $R_1$, $R_2$, $R_3$, $R_4$ and $R_8$ have the same meanings as defined above in formula (1) is obtained.

The disazo compound of formula (9) so obtained is diazotized in a manner known per se in the art, for instance, by using sodium nitrite in a mineral acid at 0°–30° C., followed by the coupling at 0°–30° C. and pH 5–10 with a naphthalene represented by the following formula (10):

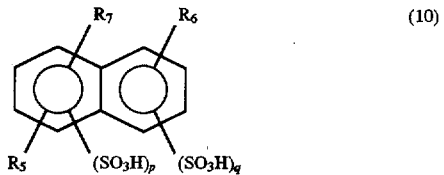

wherein $R_5$, $R_6$, $R_7$, p and q have the same meanings as defined above in formula (1), whereby the target azo compound of formula (1) can be obtained.

Each azo compound of the present invention represented by formula (3) can also be prepared in the following manner.

Namely, an azo compound represented by the following formula (11):

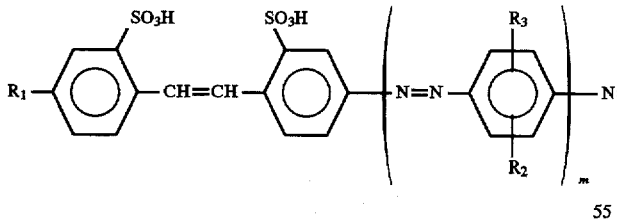

wherein $R_1$, $R_2$, $R_3$, $R_4$, $R_5$, $R_6$, m, p and q have the same meanings as defined above in formula (1) and $R_9$ represents a hydrogen atom or a $C_{1-2}$ alkoxy group is dissolved or dispersed in water and/or a hydrophilic solvent, for example in a mixed solvent of ethylene glycol or ethylene glycol monoethyl ether and water, and then an aqueous solution of copper (II) sulfate, copper (II) chloride, tetraamine copper (II), copper (II) acetate, nickel sulfate, nickel chloride, nickel acetate, zinc sulfate, zinc chloride, iron (II) sulfate or iron (II) chloride is caused to act, at 50°–100° C., preferably 90°–100° C. under alkaline conditions, preferably in the presence of ammonia, monoethanolamine or diethanolamine, on the resultant solution or dispersion, whereby the target metal-containing azo compound represented by formula (3) can be obtained.

The azo compounds of the present invention represented by formulas (1)–(4) are each used in the form of the sodium salt in general. They can also be used each in the form of the free acid or even the potassium, lithium, ammonium, alkylamine or ethanolamine salt.

Each compound represented by formula (5), that is, an aminostilbene, can be prepared in a manner known per se in the art. For instance, it can be prepared in accordance with the process described in Kogyo Kagaku Zasshi (J. Chem. Soc. Jpn. Ind. Chem. Sect.), 73(1), 187–194 (1970) or GB 869,372.

The compound represented by the following formula (12):

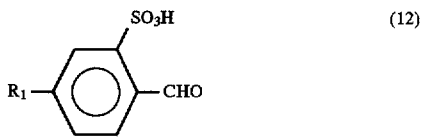

wherein $R_1$ has the same meaning as defined above in formula (1) is reacted with 4-nitrotoluene-2-sulfonic acid at 100°–200° C. in an aprotic polar solvent such as N,N-dimethylformamide in the presence of a base such as piperidine to obtain the compound represented by the following formula (13):

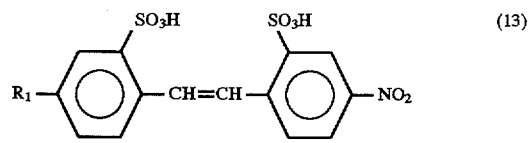

wherein $R_1$ has the same meaning as defined above in formula (1).

The nitro group of the compound of formula (13) is subjected to reduction in a manner known per se in the art, whereby the target aminostilbene represented by formula (5) can be obtained.

Specific examples of the aniline represented by formula (6) include p-cresidine, 2,5-dimethoxyaniline, 2,5-diethoxyaniline, o-anisidine, m-acetylamino-o-anisidine, 5-acetylamino-2-methoxyaniline, 5-acetylamino-2-ethoxyaniline, o-toluidine, m-toluidine, p-xylidine, m-anisidine, m-acetylaminoaniline, m-acetylamino-o-anisidine and aniline. Specific examples of the aniline represented by formula (8), on the other hand, include p-cresidine, 2,5-dimethoxyaniline, 2,5-diethoxyaniline, o-anisidine, m-acetylamino-o-anisidine, 5-acetylamino-2-methoxyaniline and 5-acetylamino-2-ethoxyaniline.

Specific examples of the naphthalene represented by formula (10) include 1-hydroxy-6-aminonaphthalene-3-sulfonic acid (hereinafter abbreviated as "J acid"), N-phenyl J acid, N-methyl J acid, N-acetyl J acid, N-methyl-N-acetyl J acid, N-benzoyl J acid, N-(3- or 4-carboxyphenyl) J acid, N-(3- or 4-sulfophenyl) J acid, N-(4-amino-3-sulfophenyl) J acid, N-(4-hydroxy-3-carboxyphenyl) J acid, N-(4-aminobenzoyl) J acid, N-(4-amino-3-sulfobenzoyl) J acid, N-(4-hydroxy-3-carboxy-benzoyl) J acid, N-(4-nitrophenyl) J acid, N-(4-nitro-benzoyl) J acid, N-(4-amino-3-methylbenzoyl) J acid, N-(3- or 4-carboxybenzoyl) J acid, N-(3- or 4-sulfobenzoyl) J acid, N-(β-hydroxyethyl) J acid, 1-hydroxy-7-aminonaphthalene-3-sulfonic acid (hereinafter abbreviated as "γ acid"), N-phenyl γ acid, N-methyl γ acid, N-acetyl γ acid, N-methyl-N-acetyl γ acid, N-benzoyl γ acid, N-(3- or 4-carboxyphenyl) γ acid, N-(3- or 4-sulfophenyl) γ acid, N-(4-amino-3-sulfophenyl) γ acid, N-(4-hydroxy-3-carboxyphenyl) γ acid, N-(4-aminobenzoyl) γ acid, N-(4-amino-3-sulfobenzoyl) γ acid, N-(4-hydroxy-3-carboxybenzoyl) γ acid, N-(4-nitrophenyl) γ acid, N-(4-nitrobenzoyl) γ acid, N-(4-amino-3-methylbenzoyl) γ acid, N-(3- or 4-carboxybenzoyl) γ acid, N-(3- or 4-sulfobenzoyl) γ acid, N-(β-hydroxyethyl) γ acid, 1-hydroxy-8-aminonaphthalene-3,6-disulfonic acid (hereinafter abbreviated as "H acid"), N-acetyl H acid, N-benzoyl H acid, N-(p-toluene-sulfonyl) H acid, N-(benzenesulfonyl) H acid, N-(p-chlorobenzoyl) H acid, 1-hydroxy-8-aminonaphthalene-3,5-disulfonic acid (hereinafter abbreviated as "K acid"), N-acetyl K acid, 1-hydroxy-8-aminonaphthalene-5,7-disulfonic acid, 1-hydroxy-7-aminonaphthalene-3,6-disulfonic acid, N-(p-methylphenyl) J acid and 1-naphthol-3,6-disulfonic acid. Some of these compounds are commercially available.

As the polymer film employed in the polarizing film of this invention, a hydrophilic polymer film is preferred. Specific examples of its material include polymers such as polyvinyl alcohol, polyvinyl formal, polyvinyl acetal and polyvinyl butyral; those obtained by modifying them with ethylene, propylene, acrylic acid, maleic acid, acrylamide or the like; and cellulose resins. These polymers are particularly useful in that they have high solubility in water or a hydrophilic organic solvent, good compatibility with the compounds of the present invention and excellent film-forming property and, when stretch-oriented subsequent to formation into films, facilitate orientation of the compounds of the present invention.

As a process for producing the polarizing film of this invention by using the above-described polymer and the compound of this invention, the polymer is formed into a film, followed by dyeing; or the compound of the present invention is added to a solution of the polymer to dye the polymer solution, followed by the formation of the dyed polymer solution into a film.

The above dyeing, film formation and stretching can be conducted generally in the following manner. Namely, a polymer film is immersed at 20°–80° C., preferably 30°–50° C. for 1–60 minutes, preferably 3–20 minutes in a dye bath containing the compound according to this invention and, if necessary, inorganic salts such as sodium chloride and sodium sulfate, and dyeing assistants such as surface-active agents, the concentration of said dye being 0.1–5 wt. %, preferably 0.8–2.5 wt. % based on the polymer film to be dyed, so that the polymer is dyed. The polymer film so dyed is treated with boric acid as needed, and is then dried. As an alternative, the polymer is dissolved in water and/or a hydrophilic organic solvent such as an alcohol, glycerin or dimethylformamide, to which the compound according to the present invention is added to dye the polymer solution. The polymer solution so dyed is formed into a film by solution casting, solution coating, extrusion or the like, whereby a dyed film is produced. The concentration of the polymer dissolved in the solvent varies depending on the type of the polymer but may be 5–30 wt. % preferably 10–20 wt. %. The concentration of the compound according to the present invention dissolved in the solvent also varies depending on the type of the polymer, the type of the dye, the thickness of the resulting film, performance of the film required upon employment as a polarizing film, etc., but may generally be 0.1–5 wt. % with about 0.8–2.5 wt. % being preferred.

The unstretched film which has been obtained by dyeing or film formation as described above is stretched in a uniaxial direction by a suitable method. By this stretching, dye molecules are oriented to develop polarizing ability. Illustrative uniaxial stretching methods include wet draw stretching, dry draw stretching, dry inter-roll compression stretching, etc. The stretching can be conducted by any of such methods. Although it is preferred to conduct this stretching at a draw ratio in a range of from 2 times to 9 times, a range of from 2.5 times to 6 times is preferred when polyvinyl alcohol or a derivative thereof is used.

After the stretching and orientation, boric acid treatment is applied in order to improve the water-proofness and polarizing ability of the stretched film. By this boric acid treatment, both the light transmittance and the polarity of the film are improved. Regarding conditions for the boric acid treatment, the boric acid concentration is generally 1–15 wt. %, preferably 3–10 wt. % and the treatment temperature may desirably be in a range of 30°–80° C., preferably 40°–80° C. The treatment cannot bring about sufficient effects when the concentration of boric acid is lower than 1 wt. % or the temperature is lower than 30° C. When the concentration of boric acid is higher than 15 wt. % or the temperature exceeds 80° C., however, the resulting polarizing film will be brittle. Boric acid concentrations and treatment temperatures outside their respective ranges described above are therefore not preferred.

The azo compounds represented by formula (1) or (3) can be used either singly or in combination. Moreover, combinations of one or more other dyes with the compounds of the present invention make it possible to produce polarizing films dyed in various hues. When such other dyes are combined, any dyes can be used as such other dyes as long as they have characteristic absorption in a wavelength range different from those of the compounds of the present invention and are provided with a high degree of dichroism. The followings are examples of particularly preferred dyes as expressed in terms of color index (C.I.) generic names:

C.I. Direct Yellow 12, C.I. Direct Yellow 44,

C.I. Direct Yellow 28, C.I. Direct Yellow 142,

C.I. Direct Red 2, C.I. Direct Red 79,

C.I. Direct Red 81, C.I. Direct Red 247,

C.I. Direct Violet 9, C.I. Direct Violet 51,

C.I. Direct Orange 26, C.I. Direct Orange 39,

C.I. Direct Orange 107, C.I. Direct Blue 1,

C.I. Direct Blue 71 C.I. Direct Blue 78,

C.I. Direct Blue 168, C.I. Direct Blue 202,

C.I. Direct Brown 106, C.I. Direct Brown 223,

C.I. Direct Green 85, C.I. Direct Black 17,

C.I. Direct Black 19.

When five kinds of dyes, that is, at least one compound represented by formula (1), C.I. Direct Yellow 12, C.I. Direct Orange 39, C.I. Direct Red 81 and C.I. Direct Blue 202 or four kinds of dyes, that is, at least one compound represented by formula (3), C.I. Direct Orange 39, C.I. Direct Red 81 and C.I. Direct Blue 202 are employed as components for neutral colors which are used particularly widely, polarizing films capable of exhibiting superb polarizing properties and preferred absorption characteristics can be obtained. Moreover, they have good dyeability and show no color irregular and their hydrothermoresistance is also excellent.

The polarizing films produced as described above can be used by applying various processing thereto. For example, they can be formed as films or sheets and can be used as they are. Depending on application purposes, they can be laminated with a polymer such as a triacetate, acrylic or urethane polymer to form protective layers thereon. Further, transparent conductive films of indium-tin oxides or the like can be formed for actual applications on the surfaces of the polarizing films by vacuum deposition, sputtering or coating.

The present invention will hereinafter be described by specific examples. It is to be noted that these examples are merely illustrative and are not intended to limit the present invention thereto. Incidentally, all designations of "part" or "parts" in the examples indicate part or parts by weight. The term "polarity" as used herein is a value measured by the following method. Namely, two polarizing films were placed in the optical path of a spectrophotometer with their stretched directions extending in parallel with each other. Based on the light transmittance (Tp) so measured at the maximum absorption wavelength in the visible range and the light transmittance (Tc) at the same wavelength as measured by superposing the two polarizing films with their stretched directions extending at a right angle, the polarity (V) was calculated using the following formula:

$$V = \sqrt{\frac{Tp - Tc}{Tp + Tc}} \times 100(\%)$$

EXAMPLE 1

Suspended in 900 parts of water in a reaction vessel were 30 parts (0.084 mol) of 4-aminostilbene-2,2'-disulfonic acid, followed by the addition of 43 parts of concentrated hydrochloric acid. The resultant suspension was cooled to 5°–10° C. over an ice bath, followed by the addition of 7 parts (0.103 mol) of sodium nitrite and diazotization for 2 hours. Excess nitrous acid was eliminated by the addition of sulfamic acid. After a solution of 14 parts (0.102 mol) of p-cresidine in an aqueous solution of hydrochloric acid was added to the reaction mixture, sodium acetate was added to acidify the resultant mixture to pH 4 so that coupling was effected for 2 hours. After the completion of the reaction, the reaction mixture was filtered to obtain a presscake. The presscake was suspended in 1200 parts of water in another reaction vessel, followed by the addition of 43 parts of concentrated hydrochloric acid. The resultant suspension was cooled to 5°–10° C. over an ice bath and then, 7 parts (0.103 mol) of sodium nitrite were added to the suspension, whereby diazotization was carried out for 2 hours. Excess nitrous acid was thereafter eliminated by the addition of sulfamic acid. The aqueous solution of the resulting diazonium salt was added dropwise at 5°–10° C. to a suspension of 32 parts (0.102 mol) of N-phenyl J acid in 640 parts of a 5% aqueous sodium carbonate solution so that coupling was effected. Subsequent to stirring for 2 hours, sodium chloride was added in a great excess to induce salting out. After the reaction mixture was stirred overnight, it was filtered. A solid so collected was washed with a 3% aqueous solution of sodium chloride and then dried, whereby 66 parts of an azo compound represented by the following formula (14) were obtained. The yield of the compound was 94.8%.

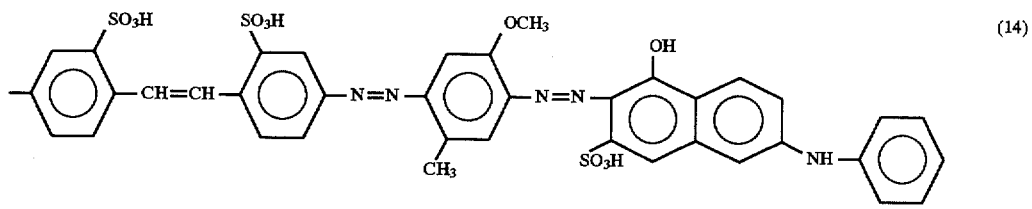

Compositional formula: $C_{38}H_{31}N_5O_{11}S_3$

| Elemental analysis data: | C | H | N | S |
| --- | --- | --- | --- | --- |
| Calculated (%) | 55.00 | 3.77 | 8.44 | 11.59 |
| Found (%) | 54.70 | 3.82 | 8.31 | 11.65 |

The compound of formula (14) was formulated into a 0.25 g/l dye bath. The dye bath was maintained at 42° C., in which a polyvinyl alcohol film of 75 μm thick was immersed to dye it for 6 minutes. The film so dyed, which was still in a wet state, was stretched 5 times at 43° C. in a 3% aqueous solution of boric acid. In the stretched state, the film was rinsed with water and dried so that a polarizing film having a bluish color was produced. The polarity V of the polarizing film at its maximum absorption wavelength $\lambda_{max}$ was measured. As a result, the single plate transmittance, $\lambda_{max}$ and V were found to be 40%, 575 nm and 99.8%, respectively.

EXAMPLE 2

In a similar manner to Example 1 except that 32 parts (0.100 mol) of 1-hydroxy-8-aminonaphthalene-5,7-disulfonic acid were used instead of N-phenyl J acid, 67 parts of an azo compound represented by the following formula (15) were obtained.

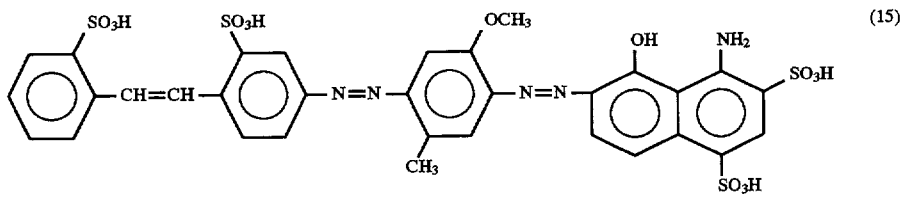

(15)

Compositional formula: $C_{32}H_{27}N_5O_{14}S_4$

| Elemental analysis data: | C | H | N | S |
|---|---|---|---|---|
| Calculated (%) | 46.09 | 3.26 | 8.40 | 15.38 |
| Found (%) | 46.22 | 3.15 | 8.31 | 15.65 |

A polyvinyl alcohol film was treated in an aqueous solution of the compound of formula (15) in a similar manner to Example 1, so that a polarizing film was produced. The polarity V of the polarizing film at its maximum absorption wavelength $\lambda_{max}$ was measured. As a result, the single plate transmittance, $\lambda_{max}$ and V were found to be 40%, 590 nm and 99.5%, respectively.

EXAMPLE 3

In a similar manner to Example 1 except that 32 parts (0.100 mol) of H acid were used instead of N-phenyl J acid, 65 parts of an azo compound represented by the following formula (16) were obtained.

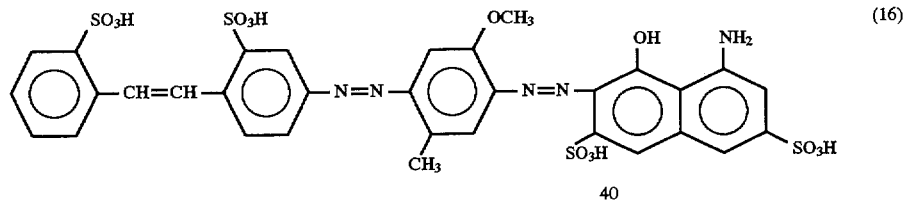

(16)

Compositional formula: $C_{32}H_{27}N_5O_{14}S_4$

| Elemental analysis data: | C | H | N | S |
|---|---|---|---|---|
| Calculated (%) | 46.09 | 3.26 | 8.40 | 15.38 |
| Found (%) | 46.24 | 3.23 | 8.36 | 15.55 |

A polyvinyl alcohol film was treated in an aqueous solution of the compound of formula (16) in a similar manner to Example 1, so that a polarizing film was produced. The polarity V of the polarizing film at its maximum absorption wavelength $\lambda_{max}$ was measured. As a result, the single plate transmittance, $\lambda_{max}$ and V were found to be 40%, 585 nm and 99.6%, respectively.

EXAMPLES 4–18

In a similar manner to Examples 1–3, compounds of formula (1) shown in Table 1 were obtained. In the table, each hue, $\lambda_{max}$, single plate transmittance and polarity are those observed or measured upon dyeing of a PVA film.

TABLE 1

| Example | Structural Formula | $\lambda_{max}$ (nm) | Single plate transmittance | Polarity | Hue |
|---|---|---|---|---|---|
| 4 | | 575 | 40 | 99.6 | Purple |
| 5 | | 585 | 41 | 99.0 | Blue |
| 6 | | 590 | 40 | 99.5 | Blue |
| 7 | | 590 | 41 | 99.2 | Blue |

TABLE 1-continued

| Example | Structural Formula | λ$_{max}$ (nm) | Single plate transmittance | Polarity | Hue |
|---|---|---|---|---|---|
| 8 | [structure] | 575 | 40 | 99.6 | Purple |
| 9 | [structure] | 575 | 40 | 99.6 | Purple |
| 10 | [structure] | 520 | 40 | 99.7 | Red |
| 11 | [structure] | 515 | 41 | 99.2 | Red |

TABLE 1-continued

| Example | Structural Formula | $\lambda_{max}$ (nm) | Single plate transmittance | Polarity | Hue |
|---|---|---|---|---|---|
| 12 | | 570 | 40 | 99.4 | Purple |
| 13 | | 580 | 40 | 99.2 | Bluish Purple |
| 14 | | 530 | 41 | 99.3 | Reddish Purple |
| 15 | | 575 | 40 | 99.0 | Purple |
| 16 | | 585 | 40 | 99.1 | Blue |

TABLE 1-continued

| Example | Structural Formula | $\lambda_{max}$ (nm) | Single plate transmittance | Polarity | Hue |
|---|---|---|---|---|---|
| 17 | (structure) | 570 | 40 | 99.5 | Purple |
| 18 | (structure) | 585 | 41 | 99.1 | Blue |

EXAMPLE 19

A dye composition, which had been prepared by proportioning the compound of formula (14), C.I. Direct Yellow 12, C.I. Direct Orange 39, C.I. Direct Red 81 and C.I. Direct Blue 202 at a ratio of 4:1:2:3:10, was formulated into a 2.0 g/l dye bath. The dye bath was maintained at 42° C., in which a polyvinyl alcohol film of 75 μm thick was immersed to dye it for 3 minutes. The film so dyed, which was still in a wet state, was stretched 5 times at 43° C. in a 3% aqueous solution of boric acid. In the stretched state, the film was rinsed with water and dried so that a polarizing film having a neutral color was produced. The polarity of the polarizing film at 41% single plate transmittance was 98%. The polarizing ability of the polarizing film having a neutral color was measured after it was left over for 500 hours in a 80° C.-85% RH thermo-hygrostat. As a result, no difference was observed between the polarizing abilities before and after the test. In addition, the film had good dyeability and no color irregularity was observed thereon.

EXAMPLE 20

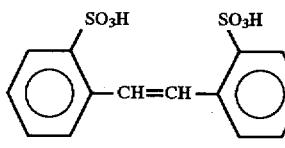

In a similar manner to Example 19 except that a polyvinyl alcohol film was treated in a dye bath containing the compound of formula (15) instead of the compound of formula (14), a polarizing film was produced. The polarity of the polarizing film at 40% single plate transmittance was 98%. The polarizing ability of the polarizing film having a neutral color was measured after it was left over for 500 hours in a 80° C.-85% RH thermo-hygrostat. As a result, no difference was observed between the polarizing abilities before and after the test. In addition, the film had good dyeability and no color irregularity was observed thereon.

EXAMPLE 21

In a similar manner to Example 19 except that a polyvinyl alcohol film was treated using the compound of formula (16) instead of the compound of formula (14), a polarizing film was produced. The polarity of the polarizing film at 40% single plate transmittance was 98%. The polarizing ability of the polarizing film having a neutral color was measured after it was left over for 500 hours in a 80° C.-85% RH thermo-hygrostat. As a result, no difference was observed between the polarizing abilities before and after the test. In addition, the film had good dyeability and no color irregularity was observed thereon.

EXAMPLE 22

Dissolved in 280 parts of water were 19 parts (0.023 mol) of the compound of formula (14), which has been described above in Example 1, followed by the addition of 16 parts (0.262 mol) of monoethanolamine, 4 parts (0.032 mol) of aqueous ammonia and 6 parts (0.038 mol) of copper (II) sulfate. Subsequent to heating and stirring the resultant mixture at 90° C. for 9 hours, sodium chloride was added in a great excess to induce salting out. After the reaction mixture was stirred overnight, it was filtered. A solid so collected was washed with a 3% aqueous solution of sodium chloride and then dried, whereby 18 parts of an azo compound represented by the following formula (17) were obtained. The yield of the compound was 89.2%.

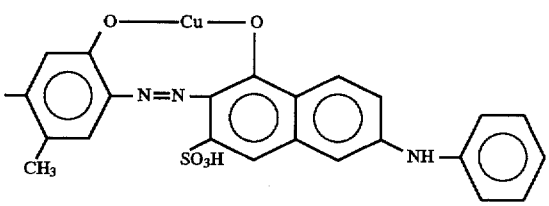

Compositional formula: $C_{37}H_{27}N_5O_{11}S_3Cu$

| Elemental analysis data: | C | H | N | S |
| --- | --- | --- | --- | --- |
| Calculated (%) | 50.65 | 3.10 | 7.98 | 10.96 |
| Found (%) | 50.41 | 3.23 | 7.92 | 10.55 |

The compound of formula (17) was formulated into a 0.25 g/l dye bath. The dye bath was maintained at 42° C., in which a polyvinyl alcohol film of 75 μm thick was immersed to dye it for 6 minutes. The film so dyed, which was still in a wet state, was stretched 5 times at 43° C. in a 3% aqueous solution of boric acid. In the stretched state, the film was rinsed with water and dried so that a polarizing film having a bluish green color was produced. The polarity V of the polarizing film at its maximum absorption wavelength $\lambda_{max}$ was measured. As a result, the single plate transmittance, $\lambda_{max}$ and V were found to be 40%, 620 nm and 99.9%, respectively.

EXAMPLE 23

Dissolved in 280 parts of water were 19 parts (0.023 mol) of the compound of formula (15), which has been described above in Example 2, followed by the addition of 16 parts (0.262 mol) of monoethanolamine, 4 parts (0.032 mol) of aqueous ammonia and 6 parts (0.038 mol) of copper (II) sulfate. Subsequent to heating and stirring the resultant mixture at 90° C. for 9 hours, sodium chloride was added in a great excess to induce salting out. After the reaction mixture was stirred overnight, it was filtered. A solid so collected was washed with a 3% aqueous solution of sodium chloride and then dried, whereby 18 parts of an azo compound represented by the following formula (18) were obtained. The yield of the compound was 88.8%.

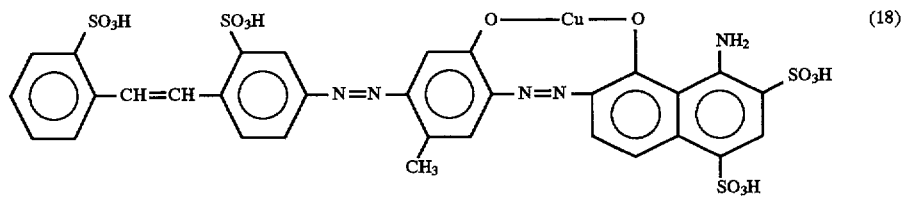

Compositional formula: $C_{31}H_{23}N_5O_{14}S_4Cu$

| Elemental analysis data: | C | H | N | S |
|---|---|---|---|---|
| Calculated (%) | 42.25 | 2.63 | 7.95 | 14.55 |
| Found (%) | 42.23 | 2.56 | 7.92 | 14.37 |

The compound of formula (18) was formulated into a 0.25 g/l dye bath. The dye bath was maintained at 42° C., in which a polyvinyl alcohol film of 75 μm thick was immersed to dye it for 6 minutes. The film so dyed, which was still in a wet state, was stretched 5 times at 43° C. in a 3% aqueous solution of boric acid. In the stretched state, the film was rinsed with water and dried so that a polarizing film having a bluish green color was produced. The polarity V of the polarizing film at its maximum absorption wavelength $\lambda_{max}$ was measured. As a result, the single plate transmittance, $\lambda_{max}$ and V were found to be 40%, 635 nm and 99.7%, respectively.

EXAMPLE 24

Dissolved in 280 parts of water were 19 parts (0.023 mol) of the compound of formula (16), which has been described above in Example 3, followed by the addition of 16 parts (0.262 mol) of monoethanolamine, 4 parts (0.032 mol) of aqueous ammonia and 6 parts (0.038 mol) of copper (II) sulfate. Subsequent to heating and stirring the resultant mixture at 90° C. for 9 hours, sodium chloride was added in a great excess to induce salting out. After the reaction mixture was stirred overnight, it was filtered. A solid so collected was washed with a 3% aqueous solution of sodium chloride and then dried, whereby 18 parts of an azo compound represented by the following formula (19) were obtained. The yield of the compound was 88.8%.

Compositional formula: $C_{31}H_{23}N_5O_{14}S_4Cu$

| Elemental analysis data: | C | H | N | S |
|---|---|---|---|---|
| Calculated (%) | 42.25 | 2.63 | 7.95 | 14.55 |
| Found (%) | 42.26 | 2.58 | 7.97 | 14.47 |

The compound of formula (19) was formulated into a 0.25 g/l dye bath. The dye bath was maintained at 42° C., in which a polyvinyl alcohol film of 75 μm thick was immersed to dye it for 6 minutes. The film so dyed, which was still in a wet state, was stretched 5 times at 43° C. in a 3% aqueous solution of boric acid. In the stretched state, the film was rinsed with water and dried so that a polarizing film having a bluish green color was produced. The polarity V of the polarizing film at its maximum absorption wavelength $\lambda_{max}$ was measured. As a result, the single plate transmittance, $\lambda_{max}$ and V were found to be 40%, 630 nm and 99.6%, respectively.

EXAMPLES 25–32

In a similar manner to Examples 22–24, compounds of formula (3) shown in Table 2 were obtained. In the table, each hue, $\lambda_{max}$, single plate transmittance and polarity are those observed or measured upon dyeing of a PVA film.

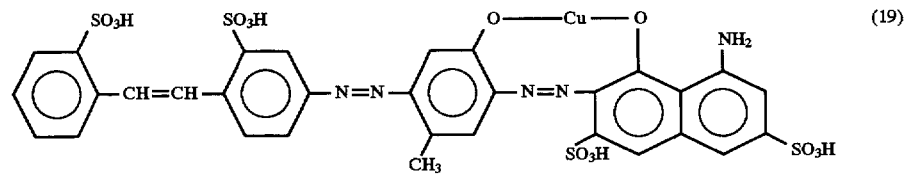

TABLE 2

| Example | Structural Formula | $\lambda_{max}$ (nm) | Single plate transmittance | Polarity | Hue |
|---|---|---|---|---|---|
| 25 | (see structure) | 620 | 40 | 99.7 | Bluish Green |
| 26 | (see structure) | 620 | 41 | 99.3 | Bluish Green |
| 27 | (see structure) | 550 | 41 | 99.2 | Reddish Purple |
| 28 | (see structure) | 635 | 40 | 99.6 | Bluish Green |

TABLE 2-continued

| Example | Structural Formula | $\lambda_{max}$ (nm) | Single plate transmittance | Polarity | Hue |
|---|---|---|---|---|---|
| 29 | | 635 | 40 | 99.5 | Bluish Green |
| 30 | | 615 | 40 | 99.6 | Bluish Green |
| 31 | | 575 | 40 | 99.5 | Purple |
| 32 | | 630 | 40 | 99.4 | Bluish Green |

EXAMPLE 33

A dye composition, which had been prepared by proportioning the compound of formula (17), C.I. Direct Orange 39, C.I. Direct Red 81 and C.I. Direct Blue 202 at a ratio of 6:4:5:1, was formulated into a 1.5 g/l dye bath. The dye bath was maintained at 42° C., in which a polyvinyl alcohol film of 75 μm thick was immersed to dye it for 3 minutes. The film so dyed, which was still in a wet state, was stretched 5 times at 43° C. in a 3% aqueous solution of boric acid. In the stretched state, the film was rinsed with water and dried so that a polarizing film having a neutral color was produced. The polarity of the polarizing film at 40% single plate transmittance was 99.5%. The polarizing ability of the polarizing film having the neutral color was measured after it was left over for 500 hours in a 80° C.-85% RH thermo-hygrostat. As a result, no difference was observed between the polarizing abilities before and after the test. In addition, the film had good-dyeability and no color irregular was observed thereon.

EXAMPLE 34

In a similar manner to Example 33 except that a polyvinyl alcohol film was treated using the compound of formula (18) instead of the compound of formula (17), a polarizing film was produced. The polarity of the polarizing film at 40% single plate transmittance was 99.2%. The polarizing ability of the polarizing film having a neutral color was measured after it was left over for 500 hours in a 80° C.-85% RH thermo-hygrostat. As a result, no difference was observed between the polarizing abilities before and after the test. In addition, the film had good dyeability and no color irregular was observed thereon.

EXAMPLE 35

In a similar manner to Example 33 except that a polyvinyl alcohol film was treated using the compound of formula (19) instead of the compound of formula (17), a polarizing film was produced. The polarity of the polarizing film at 40% single plate transmittance was 99.3%. The polarizing ability of the polarizing film having a neutral color was measured after it was left over for 500 hours in a 80° C.-85% RH thermo-hygrostat. As a result, no difference was observed between the polarizing abilities before and after the test. In addition, the film had good dyeability and no color irregularity was observed thereon.

COMPARATIVE EXAMPLE 1

In a similar manner to Example 1 except that the compound, which had been synthesized in Example 22, was replaced by the compound disclosed in Example 3 of Japanese Patent Laid-Open No. 145255/1984 (Example 6 of U.S. Pat. No. 4,514,559) and represented by the following structural formula (A):

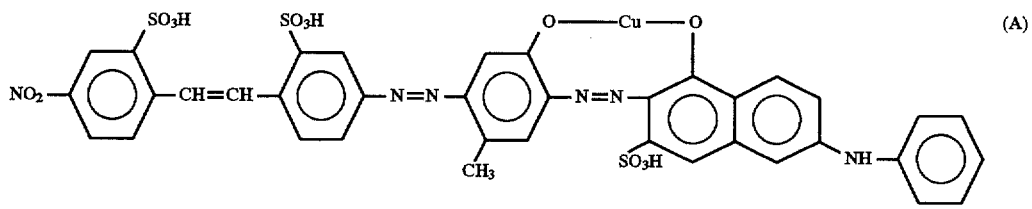

a polarizing film was produced. The polarity of the polarizing film at its 625 nm maximum absorption wavelength and 41% single plate transmittance was 98%, which was inferior to those of the polarizing films obtained using the compounds of the present invention.

COMPARATIVE EXAMPLE 2

In a similar manner to Example 33 except that the compound, which had been synthesized in Example 22, was replaced by the compound represented by the above formula (A), a polarizing film having a neutral color was produced.

The polarity of the polarizing film at 41% single plate transmittance was 95%. The film had inferior dyeability and polarizing ability to those of the polarizing films obtained using the compounds of the present invention.

The polarizing ability of the polarizing film having the neutral color was measured after it was left over for 500 hours in a 80° C.-85% RH thermo-hygrostat. As a result, no difference was observed between the polarizing abilities before and after the test. The film, however, was tinged yellow after the test, showing a change in hue.

COMPARATIVE EXAMPLE 3

In a similar manner to Example 33 except that instead of the dye bath, which had been formulated in Example 33, a 2.0 g/l dye bath was formulated by proportioning the dye disclosed in Example 2 of U.S. Pat. No. 4,859,039, C.I. Direct Yellow 12, C.I. Direct Orange 26, C.I. Direct Black 17 and C.I. Direct Blue 202 at a ratio of 3:5:4:125, a polarizing film having a neutral color was produced.

The polarity of the film at 40% single plate transmittance was 96%. The film had inferior polarizing ability to those of the neutral-color polarizing films obtained using the compounds of the present invention.

What is claimed is:

1. An azo compound represented by the following formula (1):

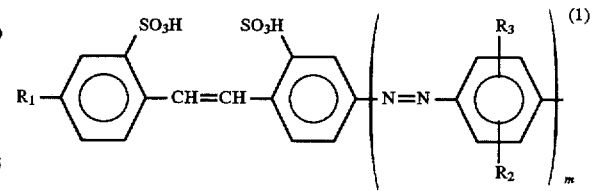

-continued

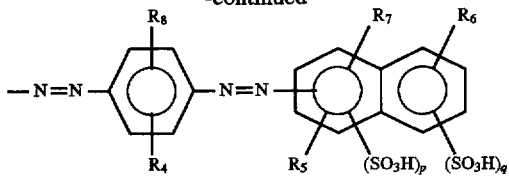

wherein $R_1$ represents a hydrogen atom, a hydroxyl group or a sulfonic acid group; $R_3$ and $R_8$ individually represent a hydrogen atom or a hydroxyl, $C_{1-2}$ alkyl or $C_{1-2}$ alkoxy group; $R_2$ and $R_4$ individually represent a hydrogen atom or a hydroxyl, $C_{1-2}$ alkyl, $C_{1-2}$ alkoxy or $C_{1-2}$ acylamino group; $R_5$ represents a hydrogen atom or a carboxyl or $C_{1-2}$ alkoxy group; $R_6$ represents a hydrogen atom, a hydroxyl, amino, methylamino, β-hydroxyethylamino or $C_{1-2}$ acylamino group, or a phenylamino or benzoylamino group which the phenyl nucleus may be substituted by one or more nitro, amino, hydroxyl, $C_{1-2}$ alkyl, carboxyl and/or sulfonic acid groups and/or chlorine atoms; $R_7$ represents a hydroxyl or amino group and substitutes at o- or p-position relative to the azo group; m stands for 0 or 1; p stands for 0 or 1; and q stands for 0, 1 or 2 with the proviso that when m=0, $R_1$ is not a hydroxyl group.

2. An azo compound of claim 1, which is represented by the following formula (2):

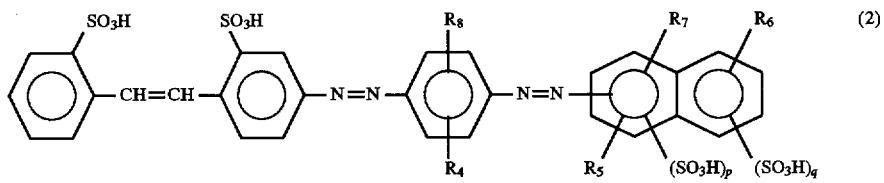

wherein $R_4$, $R_5$, $R_6$, $R_8$, p and q have the same meanings as defined above in formula (1).

\* \* \* \* \*

UNITED STATES PATENT AND TRADEMARK OFFICE
CERTIFICATE OF CORRECTION

PATENT NO. : 5,739,298

DATED: : April 14, 1998

INVENTOR(S) : Tsutami Misawa et al

It is certified that error appears in the above-identified patent and that said Letters Patent is hereby corrected as shown below:

In claim 2, line 4, after "$R_6$" insert --$R_7$--.

Signed and Sealed this

Sixteenth Day of February, 1999

Attest:

*Acting Commissioner of Patents and Trademarks*

*Attesting Officer*